UNITED STATES PATENT OFFICE.

ALFRED W. SPERRY, OF HARTFORD, CONNECTICUT, ASSIGNOR TO HIMSELF AND G. WELLS ROOT, OF SAME PLACE.

COMPOUND FOR THE MANUFACTURE OF INSULATORS, PACKINGS, &c.

SPECIFICATION forming part of Letters Patent No. 454,548, dated June 23, 1891.

Application filed December 22, 1890. Serial No. 375,515. (No specimens.)

*To all whom it may concern:*

Be it known that I, ALFRED W. SPERRY, a citizen of the United States, residing at Hartford, in the county of Hartford and State of Connecticut, have invented an Improvement in Compounds for the Manufacture of Insulators, Packings, Non-Conducting Coverings, &c., of which the following is a specification.

The object of my invention is to provide a material which, when shaped for the use to which it is to be put, shall be a non-conductor of electricity and a very poor conductor of heat, and which shall be adapted for all of the various uses of an insulating and non-conducting material.

In compounding my improved material I employ mineral wool, rubber, and boiled linseed-oil, and oxide of zinc. These ingredients are used in about the following proportions: about eight pounds of mineral wool, one and one-half pound of rubber and linseed-oil combined, and three pounds of oxide of zinc. The combined rubber and oil is prepared in any known manner, such as by dissolving a half-pound of rubber in one gallon of linseed-oil (ten pounds) in the presence of heat until the rubber is permanently dissolved. The eight pounds of mineral wool are thoroughly mixed with the one and one-half pound of rubber and oil until a homogeneous mass is formed. The three pounds of oxide of zinc are then added and the mass is thoroughly mixed, and the same is spread out in a thin mass and a moderate heat applied to evaporate and drive off the volatile portions of the oil. By this mixing and heating operation the mass is brought to a tough and plastic consistency, in which condition it may be cut into the desired shapes and pressed to further consolidate it.

When the composition is to be used for a non-conducting covering for steam or hot-air pipes or boilers, it is cut to shape and subjected to a heat of, say, 255°, for about one hour. This heat is also to be used with articles that are stamped or cut to shape in dies or molds. At this heat the composition retains a certain plasticity; but by the application of a greater heat the material can be made quite hard and adapted to be turned up or otherwise formed into various shapes for electric insulation.

My improved composition is adapted to use as a covering for steam or hot-water pipes and boilers or wherever a non-conductor of heat is required, and it can also be employed for packings and gaskets in valves, cylinders, or in other places in machinery requiring a packing, and the same is also adapted for use electrically where an insulating material is required.

I claim as my invention—

1. The improved compound herein set forth, consisting of mineral wool, rubber, and linseed-oil, and oxide of zinc, substantially as set forth.

2. The improved compound herein set forth, consisting of mineral wool, rubber, and linseed-oil, and oxide of zinc, in about the proportions of eight pounds of mineral wool, one and one-half pound of rubber and linseed-oil combined, and three pounds of oxide of zinc, substantially as set forth.

Signed by me this 17th day of December, A. D. 1890.

ALFRED W. SPERRY.

Witnesses:
GEO. T. PINCKNEY,
HAROLD SERRELL.